United States Patent [19]

Wang

[11] Patent Number: 5,584,412
[45] Date of Patent: Dec. 17, 1996

[54] BOX DISPOSED IN A CAR TRUNK

[75] Inventor: Chu T. Wang, Tainan, Taiwan

[73] Assignee: Kuan Tong Industrial Co., Ltd., Tainan, Taiwan

[21] Appl. No.: 641,421

[22] Filed: May 1, 1996

[51] Int. Cl.$^6$ ............................................. B60R 7/02
[52] U.S. Cl. .................. 220/500; 220/533; 220/541; 224/542; 224/925
[58] Field of Search ..................... 220/500, 529, 220/532, 533, 541, 542, 546; 224/42.42

[56] References Cited

U.S. PATENT DOCUMENTS

| | | | |
|---|---|---|---|
| 1,116,184 | 11/1914 | Weiss | 220/541 X |
| 1,677,544 | 7/1928 | Brainard et al. | 220/533 X |
| 1,799,831 | 4/1931 | Pauls | 220/541 |
| 1,948,935 | 2/1934 | Rand | 220/541 |
| 3,710,974 | 1/1973 | Hage | 220/546 X |
| 4,261,465 | 4/1981 | Thomas | 220/533 X |
| 4,358,035 | 11/1982 | Heidecker | 220/533 X |
| 5,381,940 | 1/1995 | Wright | 220/533 X |

*Primary Examiner*—Steven M. Pollard
*Attorney, Agent, or Firm*—Bacon & Thomas

[57] ABSTRACT

A box disposed in a car trunk includes a bottom, two opposite first walls and two opposite second walls, the bottom having at least one slit defined therein, each of two first walls having a protrusion extending from an inner peripheral surface thereof and the protrusion having a first hole defined in a distal end thereof for a first separate board pivotally engaged between the two protrusions wherein the first separate board is positioned by inserting an inserting plate extending from an lower edge of the first separate board into the slit, each of the first walls and the second walls having a flange extending transversely from an upper edge thereof and a first position hole defined in the second walls near the flange and a second position hole defined in the flange corresponding the first position hole, a sliding member disposed to each of two ends of the first separate board and engaged with the second position hole via the first position hole, at least one second separate board disposed between the second wall and the first separate board, the second separate board having a plurality of hooks disposed to one end thereof so as to hook to a plurality of loops disposed to a middle portion of the first separate board and the other end of the second separate board received in a groove defined in the second walls.

6 Claims, 10 Drawing Sheets

BOX DISPOSED IN A CAR TRUNK

BACKGROUND OF THE INVENTION

1. Field of the Invention

The present invention relates to a box and more particularly, to a box disposed in a trunk and having a plurality of separate boards disposed therein so as to suitably receive goods in the box.

2. Brief Description of the Prior Art

Most of cars have a trunk disposed in rear end of the car and the trunk is simply a space covered by a trunk cover, the trunk is designed for receiving luggage or goods therein. However, because the trunk provides simply an empty space such that when a user puts goods bought from a supermarket into the trunk, the goods may include different shapes of packs, bottles or bags and there is no suitable position means to secure the goods in position, impact between goods may happen to contaminate or even to damage the goods.

The present invention intends to provide a box disposed in the trunk and the box has a plurality of separate boards selectably disposed therein such that goods can be put in a limited and controlled space separated by the separate boards so as to mitigate and/or obviate the above-mentioned problems.

SUMMARY OF THE INVENTION

The present invention provides a box disposed in a car trunk and the box includes a bottom, two opposite first walls and two opposite second walls wherein the first walls and the second walls extend upwardly from the bottom. Each of the first walls and the second walls has a flange extending transversely from an upper edge thereof. Each of the two first walls has at least one protrusion extending from an inner peripheral surface thereof and each of the protrusions has a first hole defined in a distal end thereof. Each of the first walls and the second walls has at least one first position hole defined therein near the upper edge thereof, a second position hole defined in the flange corresponding to the first position hole.

At least one first separate board which has two ends, an upper edge and a lower edge, each of the two ends thereof having a stud extending longitudinally therefrom for being received in the first hole of the corresponding protrusion. Each one of two ends of the upper edge of the first separate board has a first lower surface formed therein and each of the first lower surfaces has a first plate extending upwardly therefrom, a first boss extending upwardly from the first plate and a first wing part extending laterally from each one of two sides of the first plate.

A sliding member has two side walls, a rear wall connected to the two side walls, a resilient upper cap extending from the rear wall and an open bottom for receiving the first plate therefrom. Each of the two side walls has a slot defined therein for receiving the corresponding first wing part therein, the upper cap having an engaging portion formed thereto so as to be engaged with the second position hole via the first position hole.

A second separate board is disposed between the first separate board and the second wall.

It is an object of the present invention to provide a box disposed in a car trunk and the box has first separate boards and second separate boards disposed therein so as to receive goods in the a controlled space defined by separate boards and prevent goods from being damaged due to an impact therebetween.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
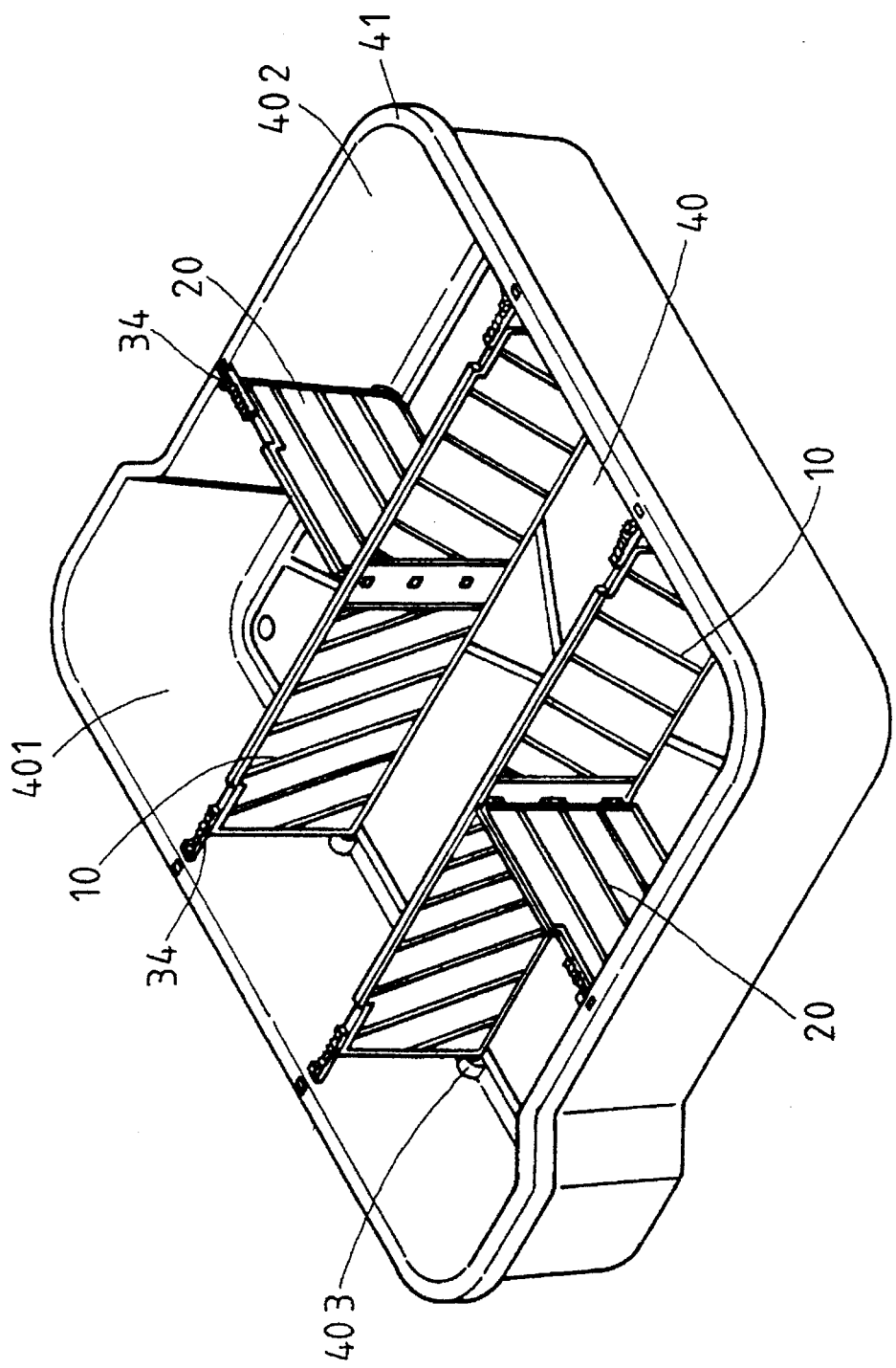
FIG. 1 is a perspective view of a box, with two first separate boards and two second separate boards disposed therein, in accordance with the present invention.
Figure 2:
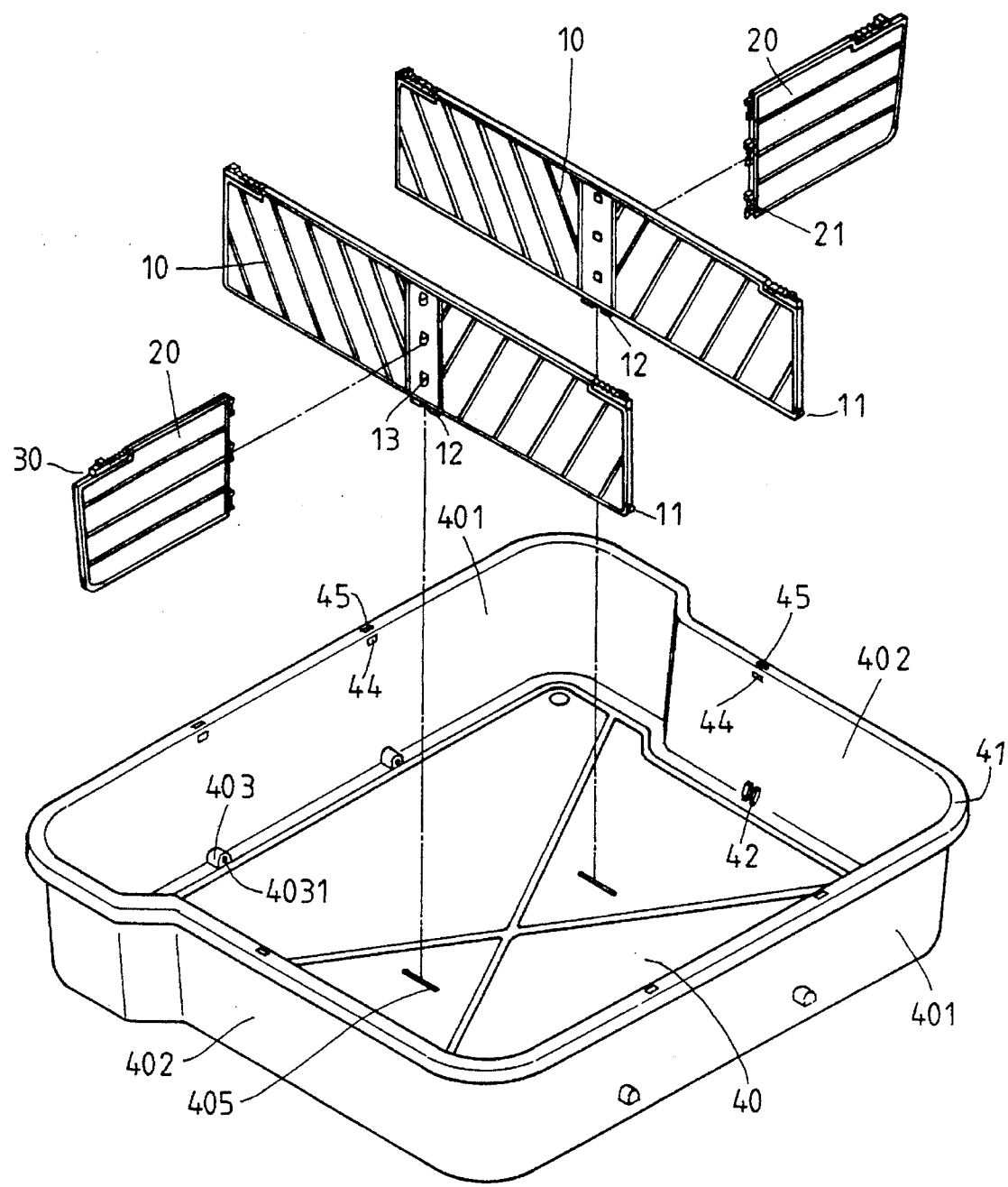
FIG. 2 is an exploded view of the box and the separate boards in accordance with the present invention.
Figure 3:
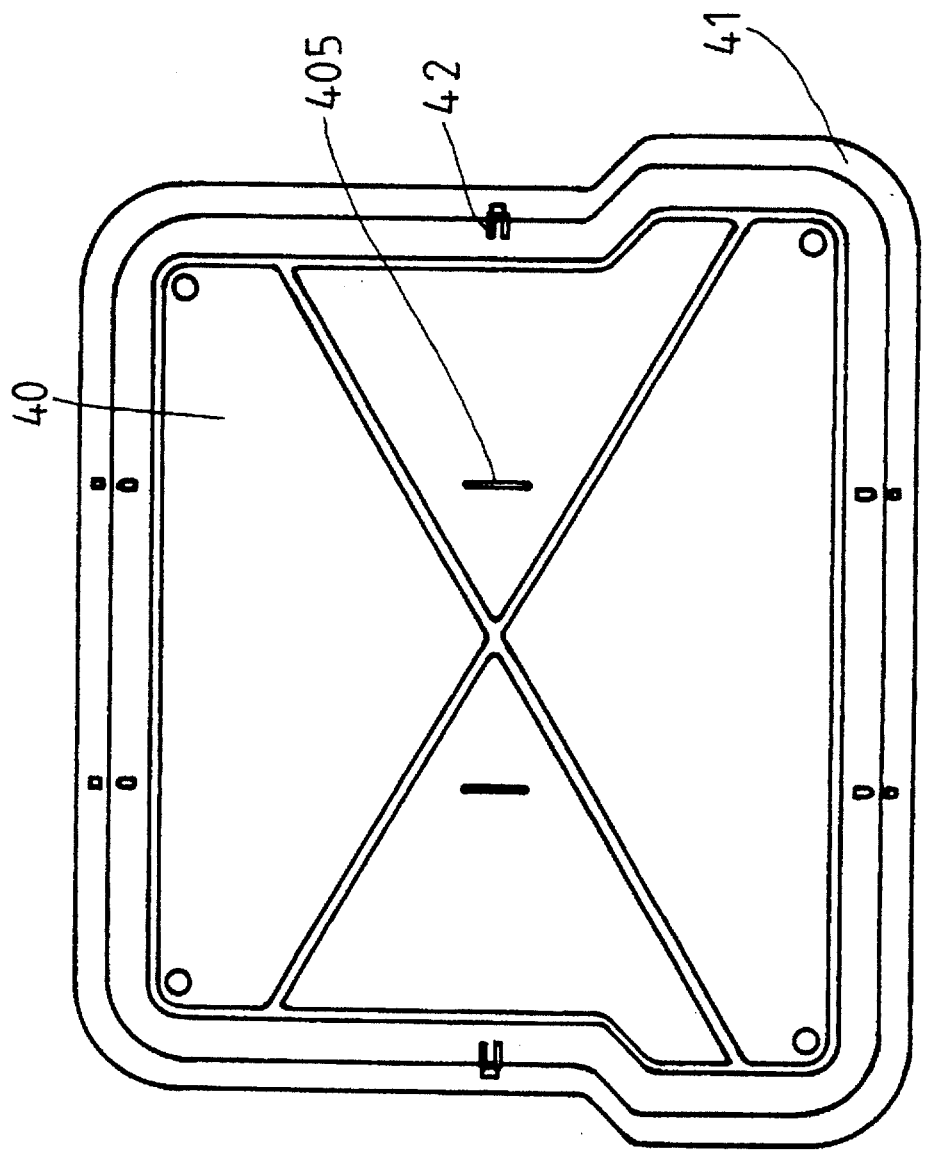
FIG. 3 is a top plan view of the box.

Referring to the drawings and initially to FIGS. 1 through 3, a box in accordance with the present invention generally includes a bottom 40, two opposite first walls 401 and two opposite second walls 402 wherein the first walls 401 and the second walls 402 extend upwardly from the bottom 40 which has two slits 405 defined therein. Each of the first walls 401 and the second walls 402 has a flange 41 extending transversely from an upper edge thereof. Each of the first walls 401 has two protrusions 403 extending from an inner peripheral surface thereof and each of the protrusions 403 has a first hole 4031 defined in a distal end thereof. Each of the first walls 401 and the second walls 402 has two first position holes 44 defined therein near the upper edge thereof, a second position hole 45 defined in the flange 41 and located corresponding to the first position hole 44. Each of the second walls 402 has two rails 42 extending from an inner peripheral surface thereof.

Two first separate boards 10 each have two ends, an upper edge and a lower edge, each of the two ends thereof having a stud 11 extending longitudinally from a lower portion thereof for being received in the first hole 4031 of the corresponding protrusion 403. Each of the first separate board 10 has a plurality of loop elements 13 disposed to each one of two sides thereof and located to a middle part of the first separate board 10. Each one of two ends of the upper edge of the first separate board 10 has a first lower surface 101 formed therein and each of the first lower surfaces 101 has a first plate 31 extending upwardly therefrom. A semi-circular resilient member 32 is disposed to an upper side of the first plate 31 and a first boss 320 extending upwardly from the resilient member 32. A first wing part 33 extends laterally from each one of two sides of the first plate 31.

Figure 4:
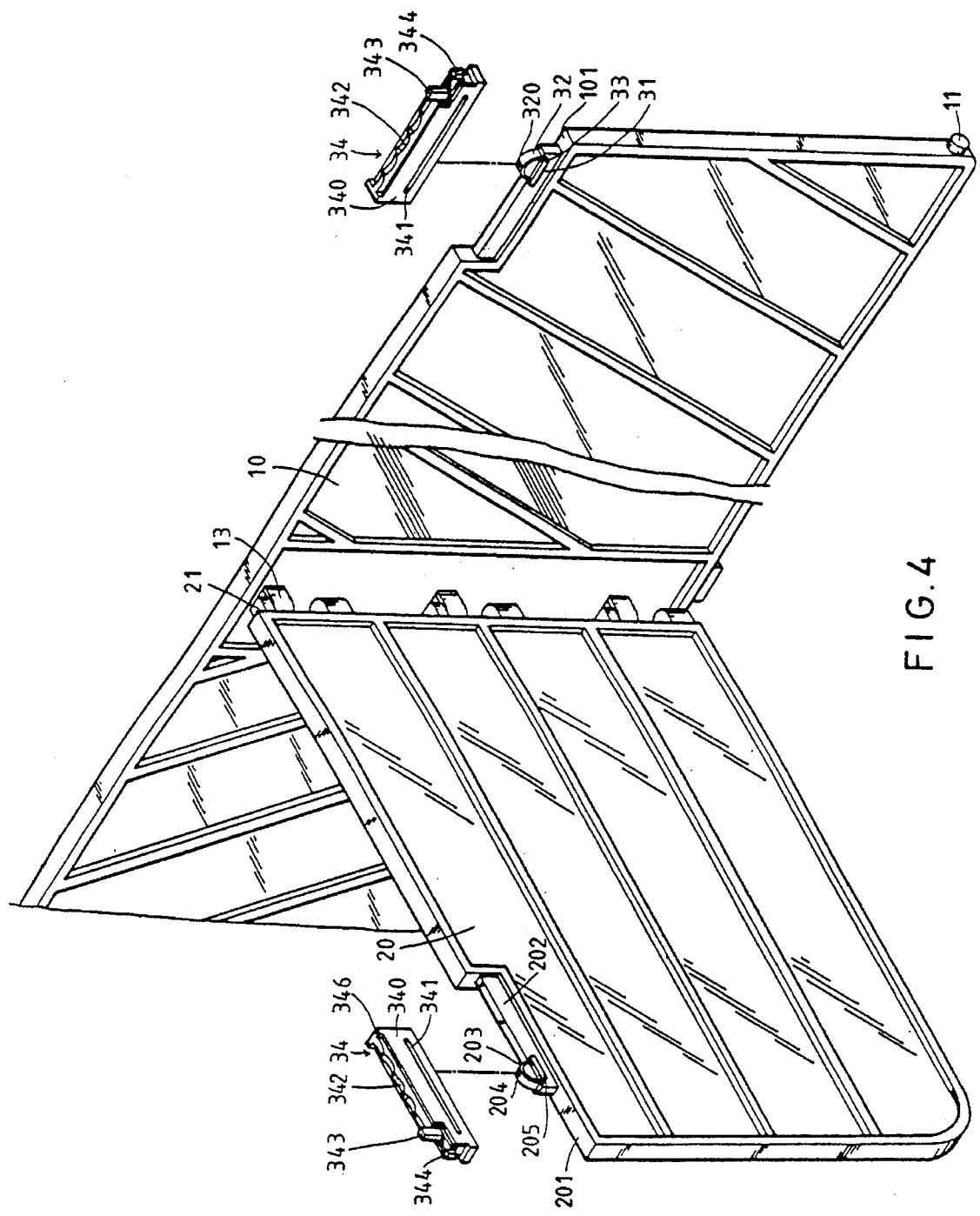
FIG. 4 is an exploded view of the first separate board, the second separate board and two sliding members.
Figure 5:
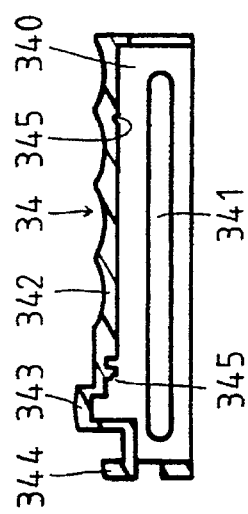
FIG. 5 is a side elevational view, partly in section, of the sliding member.
Figure 6:
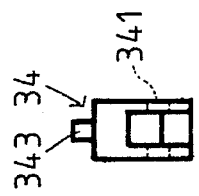
FIG. 6 is a end elevational view of the sliding member.
Figure 9:
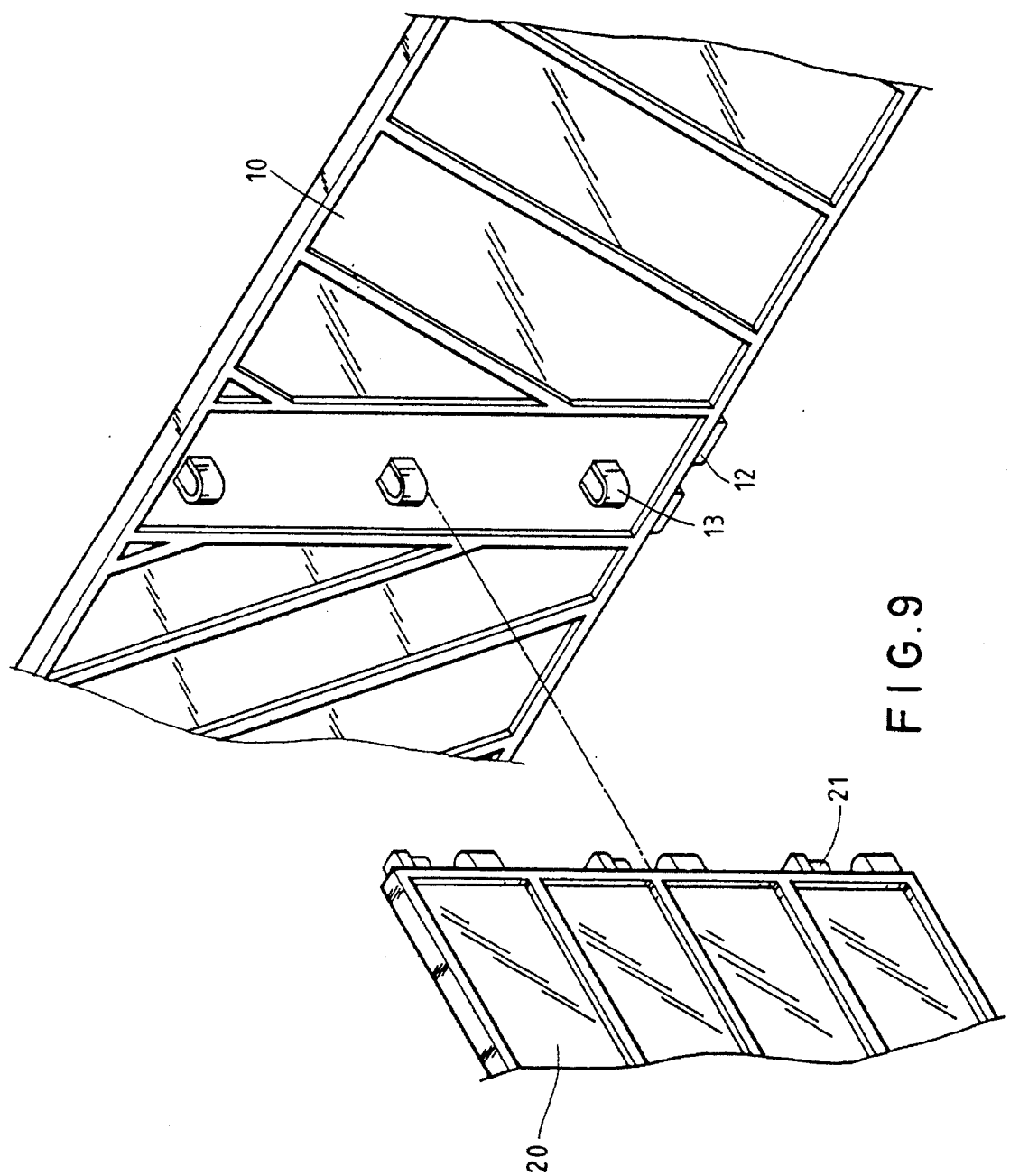
FIG. 9 is an exploded view of the first separate board and the second separate board.
Figure 10:
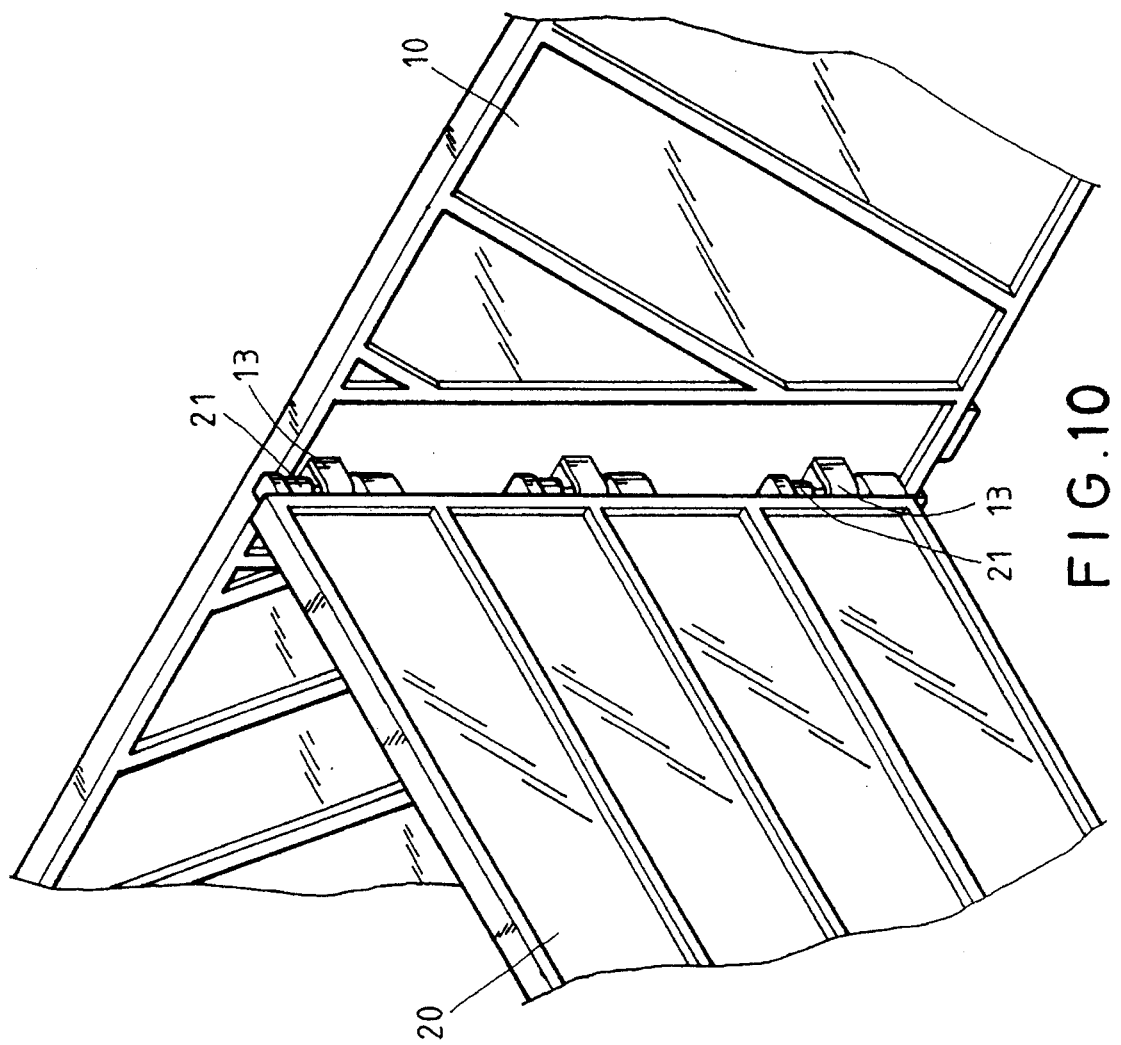
FIG. 10 is a perspective view to show the engagement between the first separate board and the second separate board.

Referring to FIGS. 4, 5 and 6, a sliding member 34 has two side walls 340, a rear wall 346 connected to the two side walls 340 and, a resilient upper cap 342 extending from the rear wall 346 and an open bottom for receiving the first plate 31 therefrom such that the sliding member 34 can be slid along the first plate 31. Each of the two side walls 340 has a slot 341 defined therein for receiving the corresponding first wing part 33 therein, the upper cap 342 having an engaging portion formed thereto which includes a shoulder portion 343 extending from the resilient upper cap 342 and a nose portion 344 extending from a distal end of the resilient upper cap 342 wherein a distance is defined between the shoulder portion 343 and the nose portion 344. The resilient upper cap 342 has two recesses 345 defined in an under side thereof for receiving the first boss 320 of the first plate 31 when the sliding member 34 is slidably disposed to the first plate 31.

Figure 7:
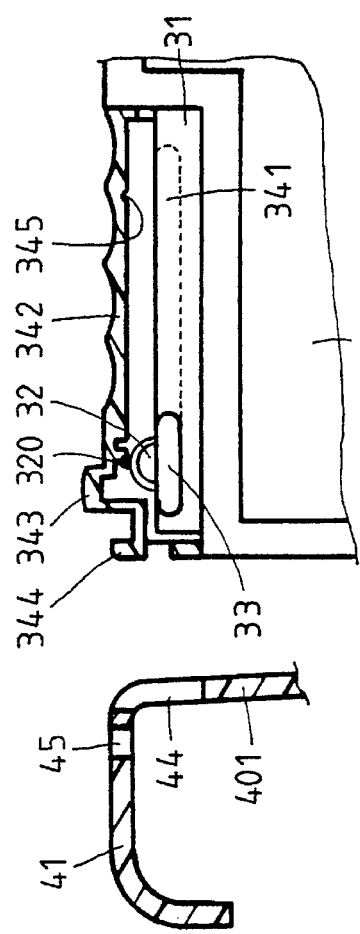
FIG. 7 is an illustrative view to show the sliding member and a part of the box.
Figure 8:
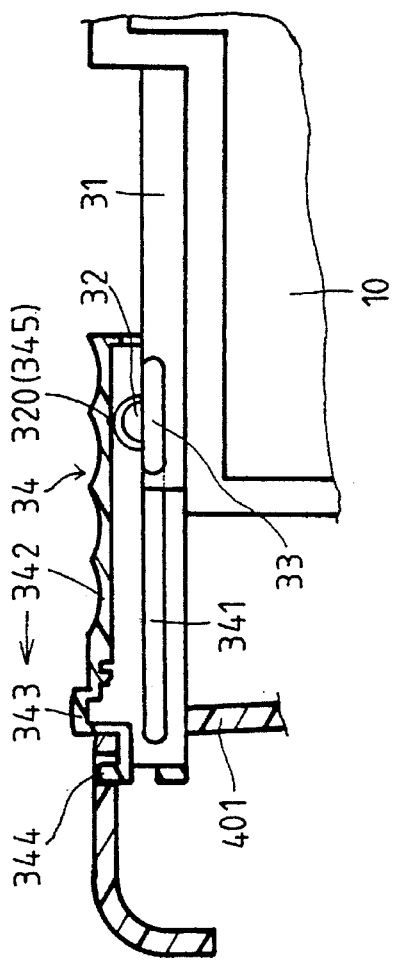
FIG. 8 is an illustrative view to show the sliding member engaged with the position holes of the box.

Referring further to FIGS. 7 and 8, when the first separate board 10 is disposed in the box, the two studs 11 are respectively received in the first holes 4031 of the corresponding protrusions 403 and the first separate board 10 has two inserting plates 12 extending downwardly from the lower edge thereof so as to insert the inserting plates 12 into the slits 405 of the bottom 40. The sliding member 34 is slid toward the first wall 401 corresponding thereto and the nose portion 344 is inserted through the first position hole 44 and then is engaged with the second position hole 45 wherein the first boss 320 is received in the recess 345 near the rear wall 346, the first separate board is thereby securely positioned.

Referring to FIGS. 2, 4, 9 and 10, two second separate boards 20 each have two ends, an upper edge and a lower edge, the second separate board 20 having a plurality of hooks 21 disposed to one of two ends thereof so as to hook the hooks 21 to the loop elements 13 of the first separate board 10. The other end of the second separate board 20 is inserted a groove defined between the two rails 42. Furthermore, each of the second separate boards 20 has a second lower surface 201 formed to an upper edge of the other end thereof, the second lower surface 201 having a second plate 202 extending upwardly therefrom, a semi-circular resilient member 203 disposed to an upper side of the second plate 202 and a second boss 204 extending upwardly from the resilient member 203. A second wing part 205 extends laterally from each one of two sides of the second plate 202. Another sliding member 34 is slidably disposed to the second plate 202 and is engaged to the second position hole 45 of the second wall 402 by the same operations as the sliding member 34 used on the first separate board 10.

Figure 11:
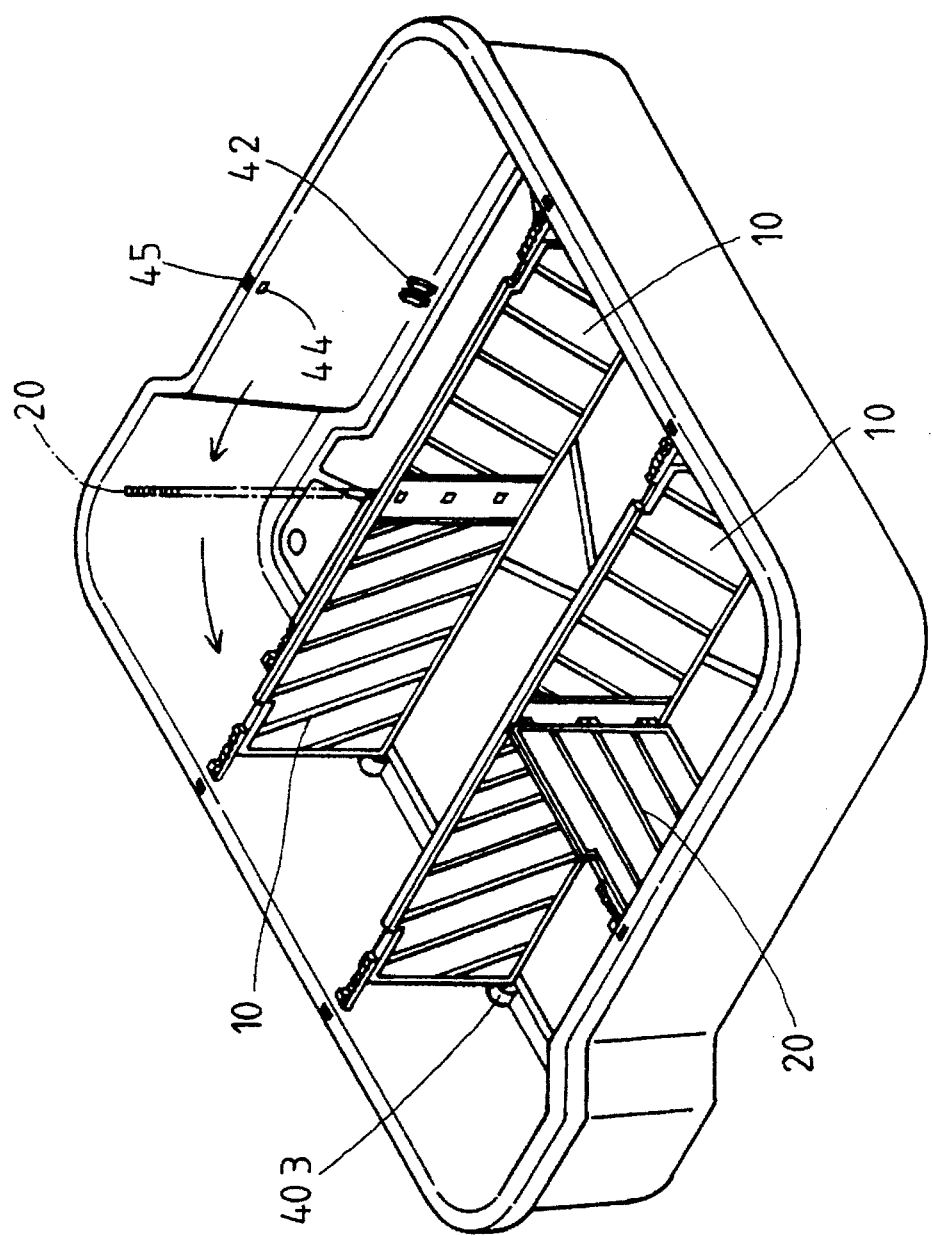
FIG. 11 is a perspective view of the box wherein a second separate board is pivoted to adjacent to a first separate board.
Figure 12:
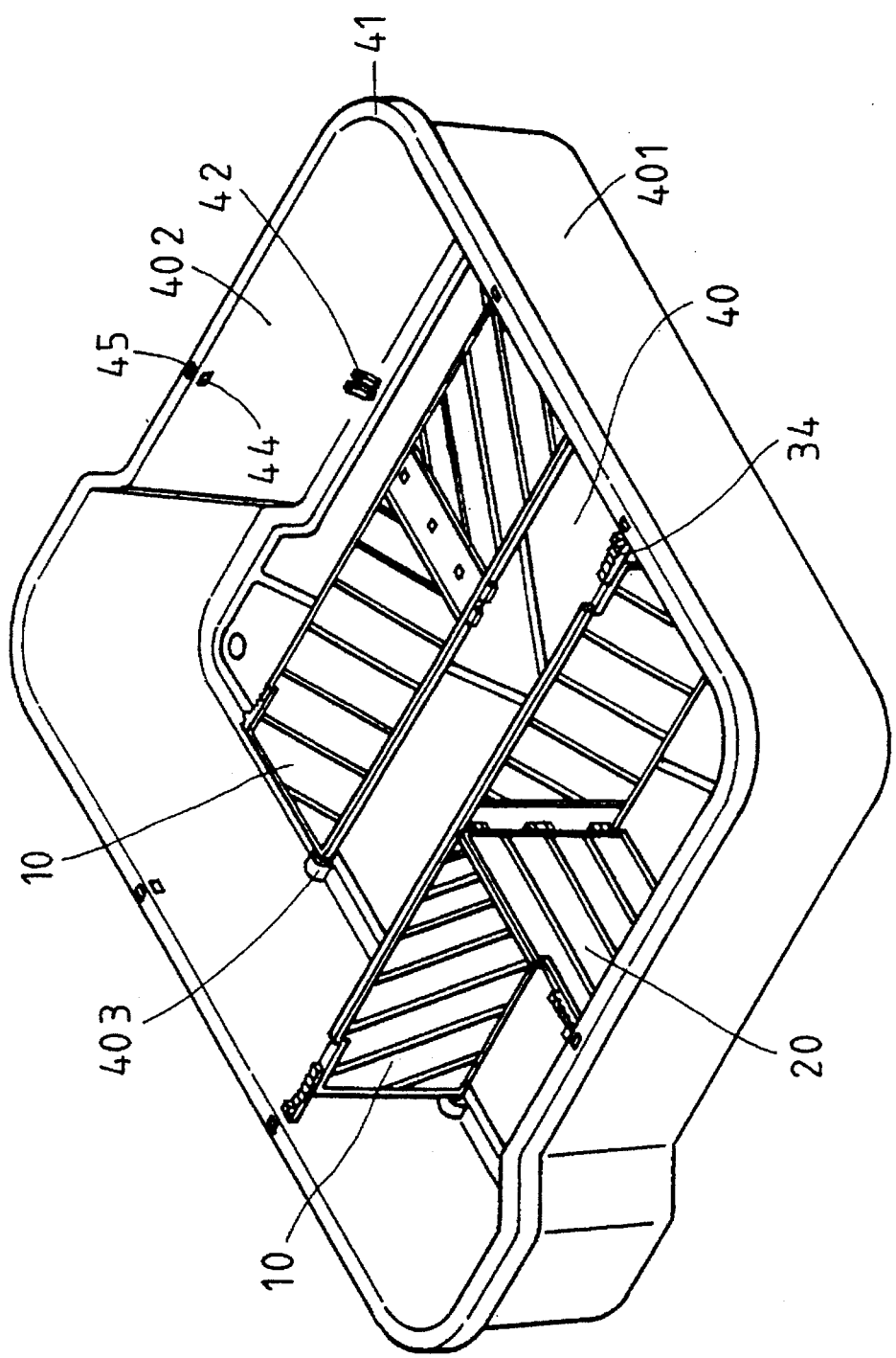
FIG. 12 is a perspective view of the box wherein the first separate board is pivoted to lie on the bottom of the box.
Figure 13:
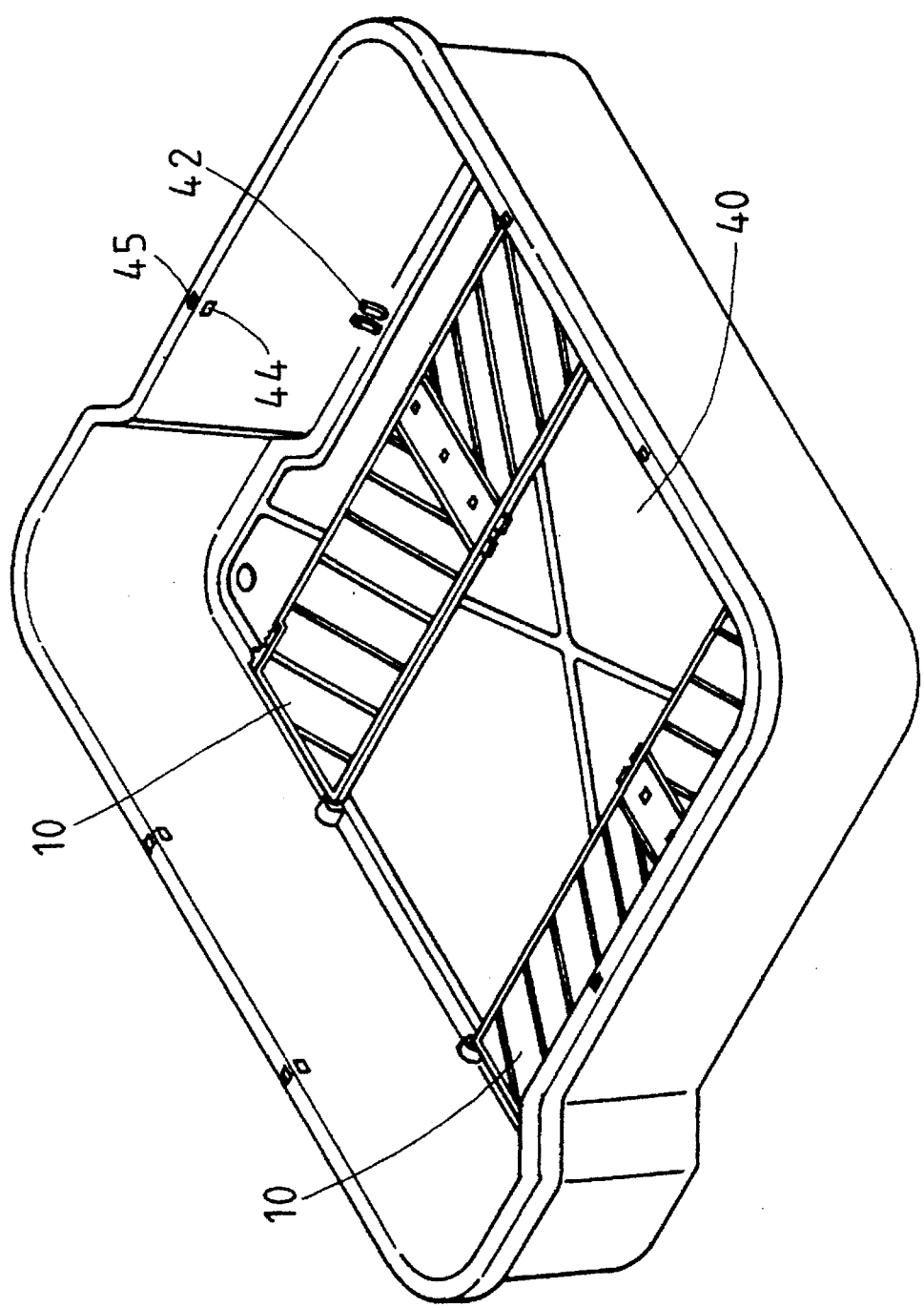
FIG. 13 is a perspective view of the box wherein the two first separate boards both lie on the bottom of the box.

Referring now to FIG. 11, the second separate board 20 can be pivoted about an axis of the hooks 21 to disposed adjacent the first separate board 10 to change the space separated by the first and the second separate boards 10, 20. The first separate board 10 is able to pivoted about an axis connected between the two protrusions 403 to lie on the bottom 40 as shown in FIG. 12 or if needed, the two first separate boards 10 can be disposed to lie one the bottom 40 as shown in FIG. 13.

Accordingly, the box in accordance with the present invention provides a driver to put his/her goods with a efficient and reliable way which prevent the goods from being damaged due to am impact in a car trunk.

Although the invention has been explained in relation to its preferred embodiment, it is to be understood that many other possible modifications and variations can be made without departing from the spirit and scope of the invention as hereinafter claimed.

What is claimed is:

1. A box disposed in a car trunk and comprising:

a bottom, two opposite first walls and two opposite second walls wherein said first walls and said second walls extend upwardly from said bottom, each of said first walls and said second walls having a flange extending transversely from an upper edge thereof, each of said first walls having at least one protrusion extending from an inner peripheral surface thereof and each of said protrusions having a first hole defined in a distal end thereof, each of said first walls and said second walls having at least one first position hole defined therein near said upper edge thereof, a second position hole defined in said flange and located corresponding to said first position hole;

at least one first separate board having two ends, an upper edge and a lower edge, each of said two ends thereof having a stud extending longitudinally therefrom for being received in said first hole of said corresponding protrusion, each one of two ends of said upper edge of said first separate board having a first lower surface formed therein and each of said first lower surfaces having a first plate extending upwardly therefrom, a first boss extending upwardly from said first plate and a first wing part extending laterally from each one of two sides of said first plate, and a sliding member having two side walls, a rear wall connected to said two side walls, a resilient upper cap extending from said rear wall and an open bottom for receiving said first plate therefrom, each of said two side walls having a slot defined therein for receiving said corresponding first wing part therein, said resilient upper cap having an engaging portion formed thereto so as to be engaged with said second position hole via said first position hole.

2. The box as claimed in claim 1 wherein said bottom of said box has at least one slit defined therein and said first separate board has an inserting plate extending downwardly from said lower edge thereof so as to be inserted into said slit.

3. The box as claimed in claim 1 further comprises at least one second separate board, said second separate board having two ends, an upper edge and a lower edge, said second separate board having a plurality of hooks disposed to one of two ends thereof and said first separate board having a plurality of loop elements disposed to each one of two sides thereof such that said second separate board is engaged to said first separate board by hooking said hooks to said loop elements of said first separate board.

4. The box as claimed in claim 3 wherein said second separate board has a second lower surface formed to an upper edge of the other end thereof, said second lower surface having a second plate extending upwardly therefrom, a second boss extending upwardly from said second plate and a second wing part extending laterally from each one of two sides of said second plate.

5. The box as claimed in claim 1 or 3 wherein each of said second walls of said box has at least two rails extending from an inner peripheral surface thereof so as to receive said second separate board in a groove defined between said two rails.

6. The box as claimed in claim 1 wherein said resilient upper cap has two recesses defined in an under side thereof for receiving said first boss of said first plate.

* * * * *